United States Patent
Gaikwad et al.

(10) Patent No.: US 9,369,165 B1
(45) Date of Patent: Jun. 14, 2016

(54) MITIGATING DESENSE IN COLLOCATED SPEAKER AND ANTENNA SYSTEM

(71) Applicant: Amazon Technologies, Inc., Reno, NV (US)

(72) Inventors: Amit Shailesh Gaikwad, Fremont, CA (US); Tzung-I Lee, San Jose, CA (US)

(73) Assignee: Amazon Technologies, Inc., Reno, NV (US)

( * ) Notice: Subject to any disclaimer, the term of this patent is extended or adjusted under 35 U.S.C. 154(b) by 55 days.

(21) Appl. No.: 14/304,733

(22) Filed: Jun. 13, 2014

(51) Int. Cl.
*H04B 1/18* (2006.01)
*H01Q 1/44* (2006.01)
*H01Q 1/24* (2006.01)

(52) U.S. Cl.
CPC ........................................ *H04B 1/18* (2013.01)

(58) Field of Classification Search
USPC ............ 455/193.1, 269, 270, 286, 288, 562.1
See application file for complete search history.

(56) References Cited

U.S. PATENT DOCUMENTS

2009/0079656 A1* 3/2009 Peyla ..................... H01Q 1/273
                                                             343/860

OTHER PUBLICATIONS

"Electrostatic discharge," Wikipedia: The Free Encyclopedia, last modified Jun. 10, 2014. <http://en.wikipedia.org/w/index.php?title=Electrostatic_discharge&oldid=612358928>.

McLellan, Paul, "Electro-static Discharge (ESD)," SemiWiki.com: "The Semiconductor Wiki Project", published May 18, 2011. <http://www.semiwiki.com/forum/content/546-electrostatic-discharge-esd.html>.

"Inductor," Wikipedia: The Free Encyclopedia, last modified May 29, 2014. <http://en.wikipedia.org/w/index.php?title=Inductor&oldid=610609322>.

"Intermodulation," Wikipedia: The Free Encyclopedia, last modified Mar. 27, 2014. <http://en.wikipedia.org/w/index.php?title=Intermodulation&oldid=601473709>.

"Definition: electrostatic discharge (ESD)," WhatIs.com, last modified Mar. 2011. <http://whatis.techtarget.com/definition/electrostatic-discharge-ESD>.

* cited by examiner

*Primary Examiner* — Blane J Jackson
(74) *Attorney, Agent, or Firm* — Polsinelli LLP (57) ABSTRACT

Embodiments of the subject technology provides a novel approach to address desense and provide electrostatic discharge (ESD) protection among components for a collocated antenna and speaker configuration in a mobile computing device. The available metal around the periphery of speaker components are used as part of implementing an antenna(s) and also for tuning the antenna, which results in an efficient antenna design that can be implemented within an available (relatively small) area of a PCB and also without adding components, which could further increase the overall cost of the mobile computing device. An inductor is used to isolate the antenna away from a ground to mitigate desense for the antenna. The inductor is connected to a diode and capacitor in series. The diode provides ESD protection for the speaker. The capacitor is connected to the diode in parallel to shunt nonlinearities generated by the diode to ground.

18 Claims, 7 Drawing Sheets

MITIGATING DESENSE IN COLLOCATED SPEAKER AND ANTENNA SYSTEM

BACKGROUND

Mobile computing devices have evolved to include more functionality. For instance, a mobile computing device (e.g., smartphone, phablet, tablet, etc.) may provide voice and data communications functionality, as well as computing, imaging, and processing capabilities. A mobile computing device may support cellular communication over a cellular network and data communication over a wireless radio channel in an example.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the subject technology may overcome one or more deficiencies experienced in existing approaches to mitigating radio antenna desense in a mobile computing device. More specifically, embodiments described herein provide implementations for reducing antenna desense while also providing electrostatic discharge protection for a computing device with collocated speaker and antenna components.

An increasing desire to support data throughput in mobile computing devices with wireless communications capabilities is pushing the design limits of devices such as smartphones and tablet computers. In supporting a wide range of features (among many others) ranging from establishing phone calls, live streaming of music and/or videos, and/or image/video capturing, mobile computing devices are also desired to have an industrial design with the smallest form factor as possible. As a part of reducing costs for manufacturing, mobile computing devices have architectures that are designed to be capable of supporting a variety of communication standards (at various frequencies and using different protocols) across the world. However, incorporating such state of the art features into a given computing device and yet still being able to use the device across the world poses an engineering challenge. In particular, features are often required to be incorporated into a computing device without adding redundant costs or increasing the size of the device.

Mobile computing devices therefore are increasingly more complex and provide more functionality. A given mobile computing device may include radio circuitry for providing communications capabilities for the mobile computing device, such as supporting cellular voice communication and wireless data communication. Such radio circuitry may include a radio receiver for communicating with a cellular network at a respective frequency. Additionally, the mobile computing device may include audio circuitry or speakers to support audible signals that provide various communications functionality.

Speakers work at a very low frequencies, which may include a standard range of audible frequencies of 20 to 20,000 Hz. Speakers, however, may be easily destroyed from an electrostatic discharge (ESD), which is known as a sudden flow of electricity between two electrically charged objects caused by contact, an electrical short, or dielectric breakdown, etc.

For instance, imagine that a person is driving in a car on a cold morning and takes out a mobile computing device (e.g., a smartphone). The person may generate an ESD which strikes a speaker included on the mobile computing device, resulting in permanent damage to the speaker. As dimensions of mobile computing devices get smaller, more portions of such devices may be potentially exposed to the outside contact (e.g., input interfaces for external data or power cables, various touch or tactile sensors, etc.) and may cause an ESD event through triboelectric charging, which refers to a separation of electric charges that occurs when two materials are brought into contact and then separated. Friction between two materials may generate triboelectric charging, for example, when walking on a rug, rubbing a plastic comb against dry hair, rubbing a balloon against a sweater, ascending from a fabric car seat, or removing some types of plastic packaging. Thus, ESD protection may be provided in one or more circuits of a mobile computing device to combat the negative consequences of ESD.

In some examples, ESD protection may be implemented using discrete components such as diodes or capacitors. However, use of such discrete components may consume printed circuit board (PCB) space, complicate PCB layout and/or compromise signal integrity. In one embodiment, an ESD protection diode may be placed at the input of the speaker to protect the speaker from ESD. Whenever there is a discharge, the diode acts to reduce an ESD input of, for example, thousands of volts down to a safe voltage for other components being protected and shunt excess current away (e.g., to ground) from such components.

However, there is another issue that may arise from having an ESD diode in close proximity with an antenna, which may be an example configuration in a mobile computing device (e.g., smartphone). Diodes may be active devices, meaning that a diode may act as a rectifier and generate nonlinearities (e.g., that affect a signal) in the circuit. One problem to be solved is that when the antenna is in close proximity with the diode, signals from the antenna will be sent to the diode and, as a result, cause the diode to generate such nonlinearities that may impact signal integrity.

Imagine that a person is listening to audio or music on the mobile computing device, and that person is also browsing the Internet or using an application to check for e-mail messages. In this scenario, an RF signal is being transmitted by the antenna and an audio signal is being received by the speaker. A diode is an example of a nonlinear element or nonlinear device, which refers to an electrical component that does not have a linear relationship between current and voltage and causes signal distortion in some instances. When cross-modulation distortion, caused by interference between the audio signal and the RF signal, converges at the diode at the same time, the diode may generate or produce cross-modulation distortion that may include harmonic frequency components (e.g., noise) near to or at the frequency at which the antenna is operating or tuned at for receiving the RF signal. These harmonics or harmonic frequency components may interfere with a frequency band that the antenna is receiving the RF signal at, and causes the antenna to be desensed. In this regard, an area of concern for radio circuitry in the mobile computing device pertains to desense (e.g., degradation in sensitivity due to noise) of an antenna and/or radio frequency receiver provided in the radio circuitry. Excessive desense may reduce receiver sensitivity and may cause the radio circuitry to drop communication links.

The subject technology, in some embodiments, provides a novel approach to address desense and provide ESD protection among one or more components for a collocated antenna and speaker configuration in a mobile computing device. Although a mobile computing device (e.g., a smart phone, an electronic book reader, or tablet computer) is mentioned, it should be understood that various other types of electronic devices that are capable of determining and processing input can be used in accordance with various embodiments discussed herein. These devices can include (but are not limited to), for example, notebook computers, personal data assistants, video gaming consoles or controllers, portable media players, and wearable computers (e.g., smart watches, smart glasses, etc.) among others.

Figure 1:
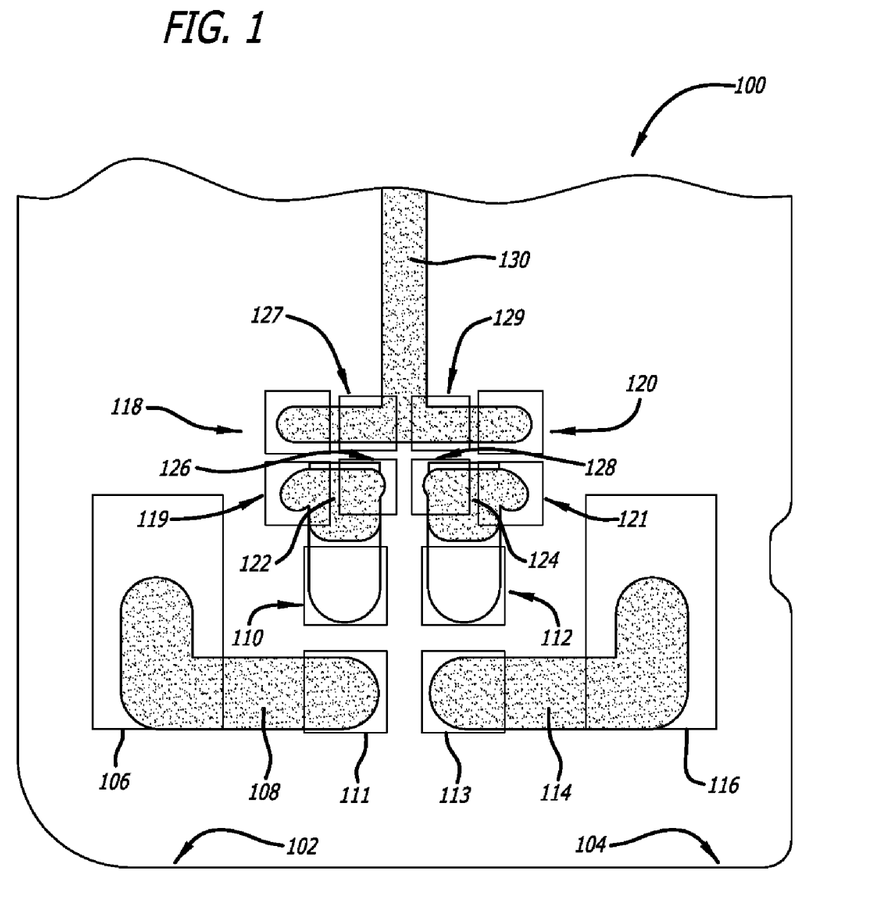
FIG. 1 conceptually illustrates an example apparatus for reducing desense and providing electrostatic protection for an antenna collocated with a speaker in accordance with some embodiments of the subject technology.

FIG. 1 conceptually illustrates an example apparatus 100 for reducing desense and providing electrostatic protection for an antenna collocated with a speaker. The apparatus 100 may be included as part of a given computing device, such as a mobile computing device with a radio transmitter/receiver to provide cellular or wireless communications. In some embodiments, the apparatus 100 shown in FIG. 1 may be utilized when a speaker is in use concurrently with a radio frequency (RF) signal being received and/or transmitted in an antenna. The apparatus 100 may include a set of components that comprise one or more electrical circuits on a PCB.

As shown in FIG. 1, the apparatus 100 includes a speaker trace 108 and a speaker trace 114. Each of the speaker traces 108 and 114 may receive a speaker signal (e.g., audio when speaking during a phone call) and carry the speaker signal to a speaker. In at least one embodiment, the speaker traces 108 and 114 comprise a metal material such as copper (or another suitable metallic and/or conductive material). As further shown, away from the speaker traces 108 and 114, the apparatus 100 includes a speaker trace 130 in a "T-shaped" region, which may also receive a speaker signal and carry the speaker signal to the speaker. The apparatus 100 includes respective areas 122 and 124 for a ground trace(s), which are not in contact with the aforementioned speaker traces as illustrated in this example. In at least one example, the respective areas 122 and 124 may include one or more pins (not shown) for connecting to ground (e.g., connecting to a ground plane provided in another layer of the PCB). As further described herein, electrical components such as a diode and/or capacitor may be connected to respective grounds provided by the ground trace in at least some embodiments.

In the example apparatus 100, one or more antennas (not shown) may be placed directly on (or integrated on top of) respective areas for speaker contacts 106 and 116. Thus, it is appreciated that at least one antenna is collocated with the speaker contacts 106 and 116 and the speaker traces 108 and 114 in at least one embodiment. In this example, the available metal around the periphery of the speaker components are used as part of implementing an antenna(s) and also for tuning the antenna, which results in an efficient antenna design that can be implemented within an available (relatively small) area of the PCB and also without adding components, which could further increase the overall cost of the apparatus 100.

The antenna(s) may exhibit desense when placed in close proximity or by virtue of being integrated therein with such speaker components. In this example, the antenna radiated power would have a cross modulation with one or more diodes (used for ESD protection) that are close to the antenna on the PCB. More specifically, in one example, when radio frequency (RF) energy from the antenna comes into contact with one or more diodes (e.g., ESD protection diodes), due to a cross modulation effect between a high power wide area network (WAN) transmit RF signal and a high amplitude speaker signal, 30 dB desense may be caused for receiving as RF signal at a radio receiver (not shown) provided by the apparatus. This magnitude of desense is caused from the diode(s) acting as a rectifier and rectifying the two high amplitude signals and coupling the energy back into the radio receiver, causing approximately 30 dB of desense. In some embodiments, a rectifier refers to an electrical component(s) that converts alternating current (AC), which periodically reverses direction, to direct current (DC), which flows in only one direction. Thus, further isolating the antenna away from the one or more diodes on the PCB helps mitigate a desense effect.

The apparatus 100 further includes portions 102 and 104 that correspond to an outer portion of the PCB. In at least one embodiment, a high band antenna is placed on top of the speaker contacts 106 and 116. While speaker contacts 106 and 116 were placed as close as possible to the high band antenna, it is important that the ground path seen by the antenna due to the speaker contacts 106 and 116 is limited and localized and does not extend into the PCB. If the antenna sees this large extended ground, its efficiency is directly impacted and would make it difficult to be efficiently tuned to a frequency of interest. One example reason is that in regard to antenna design, an antenna being exposed to too much metal (e.g., the ground traces or pads) may introduce undesirable noise and/or other unwanted effects that would directly impact the performance of the antenna.

The apparatus 100 includes pads 118, 119, 127, 126, 129, 128, 120 and 121 for placement of additional components discussed in further detail below for FIG. 2. In at least one embodiment, an ESD protection diode component is placed on the pads 118 and 119, a capacitor component is placed on the pads 127 and 126, a second capacitor component is placed on the pads 129 and 128, and a second ESD protection diode component is placed on the pads 120 and 121. Further, the apparatus 100 includes pads 110, 111 for placing a first inductor component, and pads 112 and 113 for placing a second inductor component.

Figure 2:
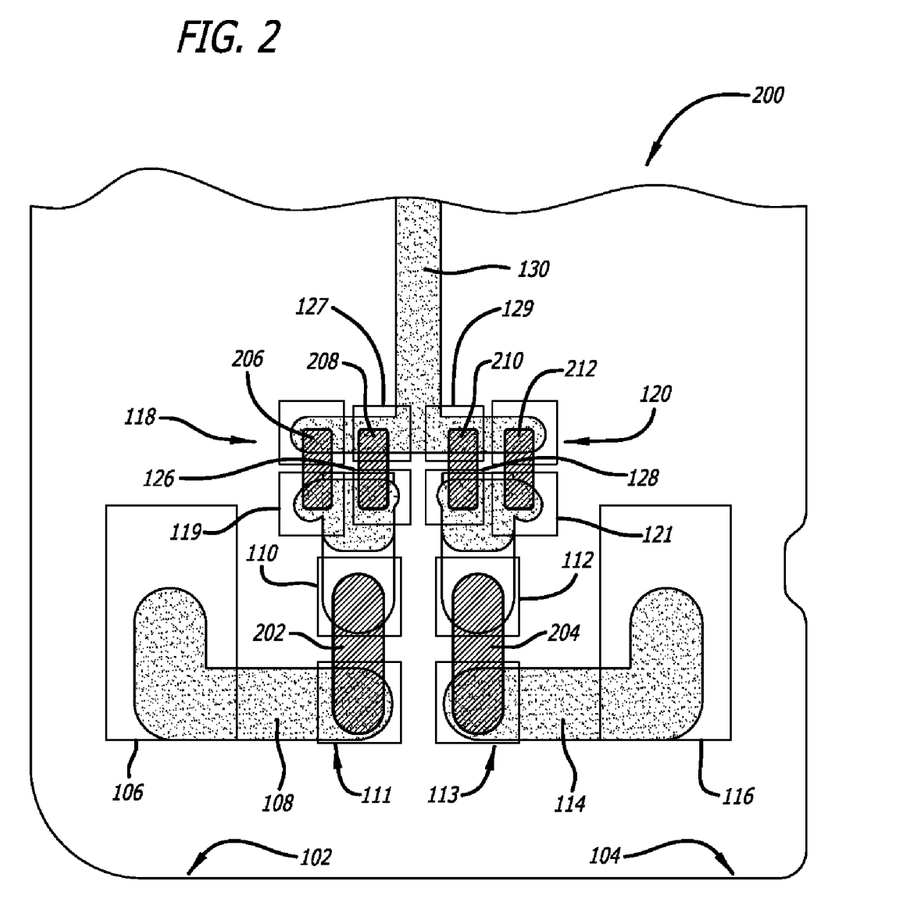
FIG. 2 conceptually illustrates an example apparatus for reducing desense providing electrostatic protection with the use of inductors, and electrostatic (ESD) protection diodes and capacitors for an antenna collocated with a speaker in accordance with some embodiments of the subject technology.

FIG. 2 conceptually illustrates an example apparatus 200 for reducing desense providing electrostatic protection with the use of inductors, and ESD diodes and capacitors for an antenna collocated with a speaker. The apparatus 200 may be included as part of a given computing device, such as a mobile computing device with a radio transmitter/receiver to provide cellular or wireless communications. The apparatus 200 is the same as the apparatus 100 shown in FIG. 1 with the difference in that additional components are now shown that are installed, by reference to FIG. 1, on pads 118, 119, 127, 126, 129, 128, 120 and 121.

As discussed before, it is important to keep the antenna away from the ground path in order to enable the antenna to be tuned to a frequency of interest in an efficient manner. In order to meet this requirement, isolation inductors were needed to be added between the speaker grounds and the antenna, so the antenna does not see any ground and is able to be tuned accurately. The subject technology utilizes the speaker assembly (and components thereof) as a part of an antenna design in an innovative manner. More specifically, an antenna may be tuned to a particular operating frequency by using the speaker assembly to tune itself (thus, keeping the cost of manufacturing the apparatus 200 lower, and while being able to support more frequency bands of communications in the apparatus 200 with the same dimensions or PCB size).

However, as discussed before, collocating the speaker with the antenna in this fashion posed challenges towards RF performance in that the speaker assembly required ESD protection diodes to be placed as close as possible to the speaker contacts 106 and 116 to discharge any ESD charge hitting the speaker contacts 106 and 116 and protect the speaker from functional or physical damage. As mentioned above, diodes act as rectifiers and cause desense. To help prevent desense, a shunt capacitor was added, in parallel, with an ESD protection diode so that radiated energy was shunted to ground instead of being coupled back into the antenna. Through this configuration, the ESD, RF and antenna requirements for designing a collocated speaker and antenna in a small form factor are met along with reducing the costs to manufacture of a device that including such a configuration for a collocated speaker and antenna design.

As illustrated in FIG. 2, the apparatus 200 includes an inductor 202 (as placed on the pads 110 and 111), an inductor 204 (as placed on the pads 112 and 113), an ESD diode 206 (as placed on the pads 118 and 119), an ESD diode 212 (as placed on the pads 120 and 121), a shunt capacitor 208 (as placed on the pads 127 and 126) and a shunt capacitor 210 (as placed on the pads 129 and 128). The ESD diode 206 and the capacitor 208 are placed in parallel, and the ESD diode 212 and the capacitor 210 are placed in parallel in this example of FIG. 2 for different sides of the signal path(s). In one example, the signal path may start from the speaker contacts 106 and 116 to the inductors 202 and 204 up to the speaker trace 130. As shown, the ESD diode 206, the capacitor 208, the ESD diode 212 and the capacitor 210 are placed over respective portions of the speaker trace 130. By separating the capacitors and the ESD diodes away from the inductors 110 and 112, at least several issues are resolved: 1) antenna functionality or RF tuning at an operating frequency, 2) ESD protection for the speaker and 3) mitigating RF desense for the antenna. For low frequencies, the inductors 110 and 112 act as a short circuit (e.g., an electrical circuit that allows a current to travel along an unintended path, often where essentially no or a very low electrical impedance is encountered) and, thus, allows a low frequency audio signal to pass through the inductors. For high frequencies, the inductors 110 and 112 act as an open circuit (e.g., an electric circuit in which the normal path of current has been interrupted, either by the disconnection of one part of its conducting pathway from another, or by the intervention of an electric component) and, thus, impedes the RF signal from passing through the inductor and reaching the remainder of the electronic components in the signal path (e.g., above the inductors 202 and 204, etc.). When an input frequency is low, a reactance of an inductor is small, and the inductor may act as a simple wire (e.g., short circuit) allowing current to freely pass through. At a high frequency, such as a frequency that the antenna may be tuned at to receive a high frequency RF signal, a reactance of an inductor is high and the inductor acts an open circuit that impedes current. Inductor reactance may be measured based on a ratio of peak voltage to peak current in an inductor that is energized from an input source or signal. An inductor therefore oppose changes in current through the inductor by dropping a voltage directly proportional to a rate of change of current. The antenna operates at high frequencies, and at such high frequencies, the result is that the inductors 110 and 112 behave as though they are not in the signal path or PCB, meaning that the speaker traces 108 and 114 (which include the speaker contacts 106 and 116) are effectively separated or isolated from the other components above the inductors 110 and 112. By using the inductors 110 and 112, the apparatus 200 avoids having the speaker contacts 106 and 116 (and speaker traces 108 and 114) being electrically coupled to the ground at the operating frequency of the antenna. For example, assume that the operating frequency of the antenna is 2.4 GHZ (e.g., a high frequency), the inductors 110 and 112, based at least on their locations on the PCB help prevent the speaker from being electrically coupled to, by reference to FIG. 1, the areas 122 and 124 for ground.

As further shown in FIG. 2 and mentioned above, the ESD diode 206 and the capacitor 208 are placed in parallel, and the ESD diode 212 and the capacitor 210 are placed in parallel for different sides of the signal path(s). The ESD diodes are included to protect the speaker from an ESD event (e.g., if there is high voltage, the ESD diodes will direct the current away). In an example circuit where a capacitor is placed in parallel with an ESD diode and also in parallel with an inductor, when an antenna is operating at or tuned to a high frequency, the capacitor at such a high frequency behaves like a short circuit and the inductor behaves like an open circuit at this high frequency, and because the capacitor and the inductor are in parallel with another, this results in a short circuit that would potentially inhibit the functionality of the antenna. Thus, by placing the ESD diodes and capacitors away from the inductors, this helps prevent any functional damage to the antenna. Further, to help in preventing RF desense, a respective capacitor is placed in in parallel with a respective ESD diode in the manner as shown in FIG. 2. By placing the capacitor 208 in parallel to the diode 206, the capacitor 208 will shunt to ground any nonlinearities or products that are generated by the diode 206. Similarly, by placing the capacitor 210 in parallel to the diode 212, the capacitor 210 will shunt to ground any nonlinearities or products that are generated by the diode 212.

In some embodiments, a speaker signal and an RF signal may both meet, at a substantially same time, at one or more of the speaker contacts 106 or 116. This may occur, for example, if a person is playing or listening to audio and using an application that accesses the Internet via a network connection at the same time. In this scenario, the antenna is operating at a high frequency (for supporting data transfers from the Internet browsing) and the speaker is operating at a lower frequency (e.g., for supporting voice or audible frequencies for the phone call or for audio playback of music, etc.). If an inductor and a diode were solely placed in parallel with each other close to the speaker contacts 106 or 116, nonlinearities may be generated by the diode, acting as a rectifier, when the RF signal and the speaker signal meets at the diode at the same time (e.g., cross-modulation distortion including one or more harmonics that would fall into a frequency in which an RF receiver was operating or tuned at) which would result in RF desense in an RF receiver. In one example, an RF signal and speaker signal meeting at the diode at the same time results in such nonlinearities being generated by the diode and would cause desense in the RF receiver. Due to RF desense in such cases, the call might be dropped or a web page might not be loaded as a result. In at least one embodiment, an RF receive signal is affected; however, an RF transmit signal may not be affected by such nonlinearities.

Figure 3:
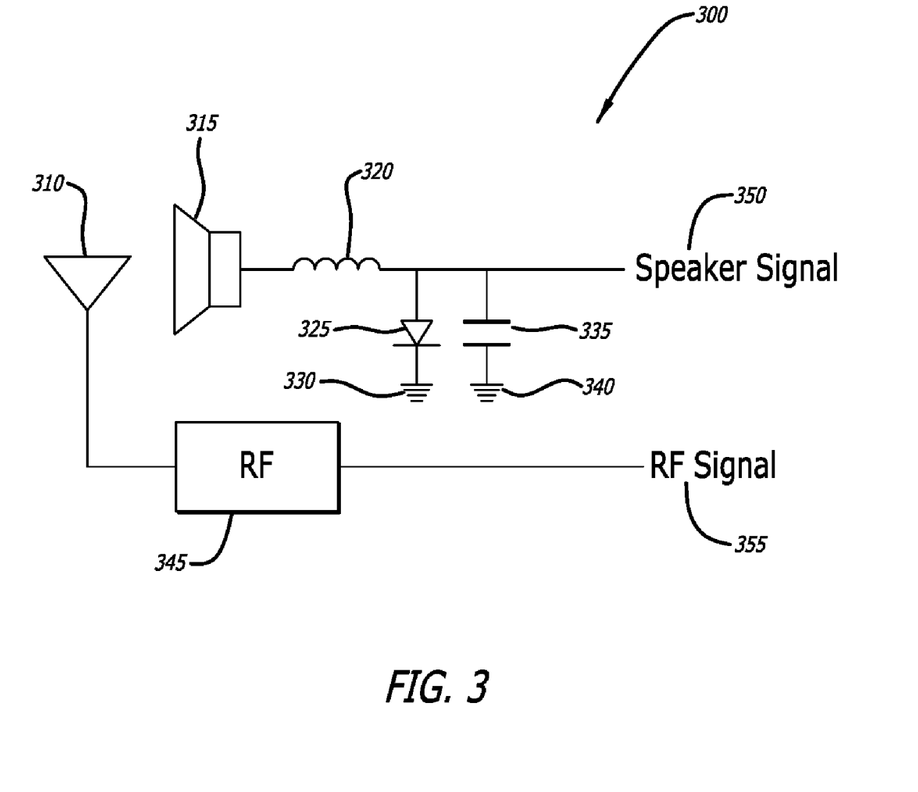
FIG. 3 conceptually illustrates an example schematic diagram of a circuit showing components of an apparatus including a collocated speaker and antenna in accordance with some embodiments of the subject technology.

FIG. 3 conceptually illustrates an example schematic diagram of a circuit showing components of an apparatus 300 including a collocated speaker and antenna in accordance with some embodiments of the subject technology. As shown in FIG. 3, an antenna 310 is coupled to a radio frequency (RF) receiver 345. The antenna 310 may be turned to operate at a specific frequency (e.g., within a range between 700 MHz to 6 Ghz) by the RF receiver 345. When the antenna 310 receives a radio frequency signal from an external source and the RF signal is fed into the RF receiver and processed (e.g., to decode the signal among other possible operations), an RF signal 355 (e.g., an RF receive signal) may be subsequently provided by the RF receiver 345.

As further shown in FIG. 3, a speaker 315 is connected in series with an inductor 320. By reference to FIG. 2, the inductor 320 may correspond to one of the inductors 110 and 112. An inductor may be characterized by inductance that represents a value corresponding to a ratio of voltage to a rate of change of current, which has units measured in henries (H). An impedance of the inductor (e.g., a measure of the opposition to a current when a voltage is applied), in some examples, is proportional with frequency in that the higher the frequency the less the inductor will conduct. In some examples, the inductor 320 may function similar to a gate that allows low-frequency current through but impedes high-frequency current/noise. By placing the inductor 320 close to the speaker 315, the speaker 315 is isolated from the ground 330 and/or the ground 340. Based on this behavior, when the antenna 310 is operating at a high frequency (e.g., in a range between 700 MHz to 6 GHz), a speaker signal 350 (e.g., from the speaker 315 or going toward the speaker 315) may pass through the inductor 320 while the an RF signal or RF energy from the antenna 310 is impeded by the inductor, thus further isolating the RF signal from reaching the rest of the electrical components in the signal path of the circuit.

The behavior of an inductor and a capacitor placed near an antenna when the antenna is operating at a high frequency may result in a short circuit which could expose the antenna to a ground (e.g., ground 330 or 340). Thus, it is important to keep the antenna 310 away from a ground path in order to enable the antenna 310 to be tuned to a frequency of interest (e.g., 700 MHz to 6 Ghz in an example) in an efficient manner. In order to meet this requirement, one or more isolation inductors (e.g., inductor 320) are placed between or coupled to a speaker ground(s) (e.g., ground 330 or 340) and the antenna 310, so the antenna 310 does not see any ground and is able to be tuned accurately. Further, any ESD diodes and capacitors may be configured in parallel and placed away from the inductors to help prevent desense in the RF receiver 345 (and as further described elsewhere herein).

As further illustrated in FIG. 3, a diode 325 is connected to a ground 330 and a capacitor 335 is connected to another ground 340, and the diode 325 and the capacitor 335 are in series with the inductor 320. The diode 325 helps prevent damage to the speaker 315 for an ESD event by shunting the ESD to ground. By placing the capacitor 335 in parallel to the diode 325, the capacitor 335 will shunt to ground any nonlinearities or products that are generated by the diode 325. In some embodiments, the capacitor 335 may pass high frequencies more effectively than low frequencies. In this manner, the capacitor 335 may be utilized as a shunt to redirect high-frequency noise (e.g., RF noise from the aforementioned nonlinearities generated by the diode) to ground.

Figure 4:
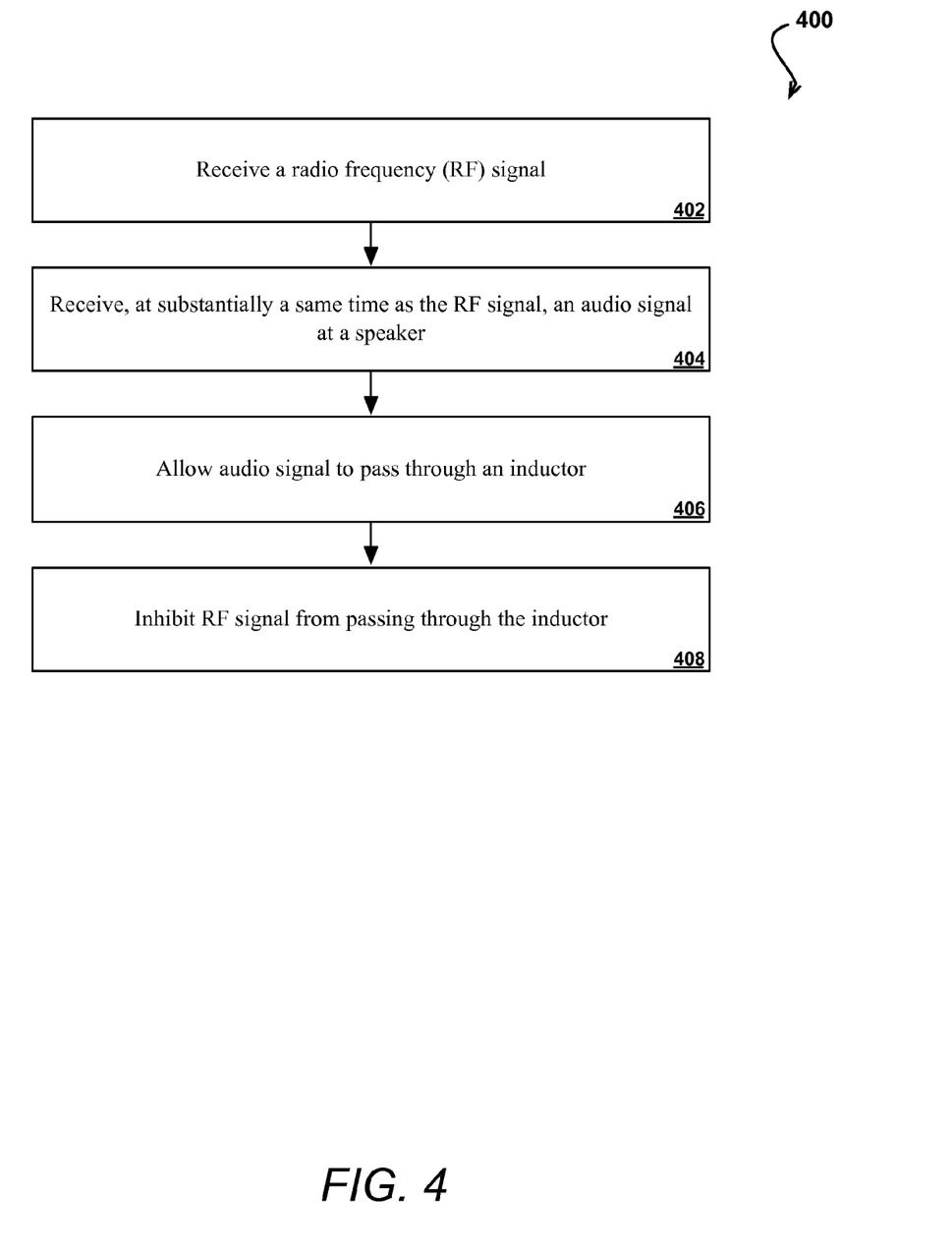
FIG. 4 illustrates steps of an example process for isolating a collocated antenna away from a ground in a mobile computing device that can be used in accordance with some embodiments of the subject technology.

FIG. 4 illustrates steps of an example process 400 for isolating a collocated antenna away from a ground in a mobile computing device that can be used in accordance with some embodiments of the subject technology. In some embodiments, the process 400 may be implemented by one or more computing devices or systems. More specifically, the process 400 may be implemented by a given mobile computing device.

In some embodiments, the process 400 may be implemented by the apparatus described in FIGS. 1-3, which may be included as part of a given computing device, such as a mobile computing device with a radio transmitter/receiver to provide cellular or wireless communications and at least one speaker.

At step 402, a radio frequency (RF) signal is received at an antenna of a mobile computing device. In some embodiments, the process 400 may be utilized when a speaker is in use concurrently with a radio frequency being received and/or transmitted. At step 404, at substantially a same time as the RF signal is being received, an audio signal is received at a speaker of the mobile computing device. At least a portion of the speaker and a portion of the antenna are collocated in the mobile computing device in at least one embodiment. At step 406, the audio signal is allowed to pass through an inductor. The inductor may be one of the inductors as described by reference to FIGS. 1-3. At step 408, the RF signal is inhibited from passing through the inductor, and the inductor is connected in series to the speaker and coupled to a ground.

Figure 5A:
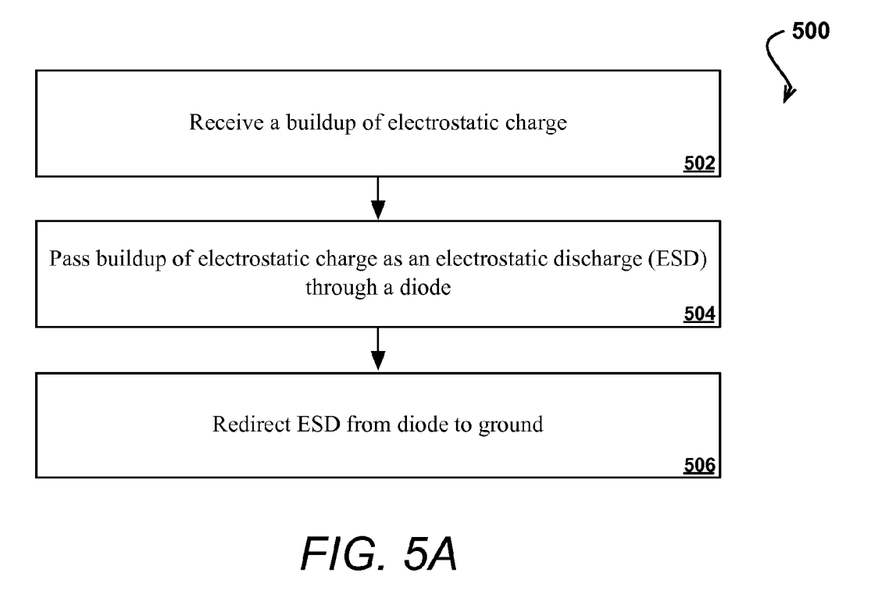
FIG. 5A illustrates steps of an example process for using a diode to redirect an electrostatic discharge to a ground in a mobile computing device that can be used in accordance with some embodiments of the subject technology.

FIG. 5A illustrates steps of an example process 500 for using a diode to redirect an electrostatic discharge to a ground in a mobile computing device that can be used in accordance with some embodiments of the subject technology. In some embodiments, the process 500 may be implemented by one or more computing devices or systems. More specifically, the process 500 may be implemented by a given mobile computing device.

In some embodiments, the process 500 may be implemented by the apparatus described in FIGS. 1-3, which may be included as part of a given computing device, such as a mobile computing device with a radio transmitter/receiver to provide cellular or wireless communications and at least one speaker.

At step 502, a buildup of electrostatic charge is received at the mobile computing device. At step 504, the buildup of electrostatic charge is passed as an electrostatic discharge through a diode. The diode is coupled to an inductor and a ground in at least one embodiment. At step 506, the electrostatic discharge is redirected from the diode to the ground.

Figure 5B:
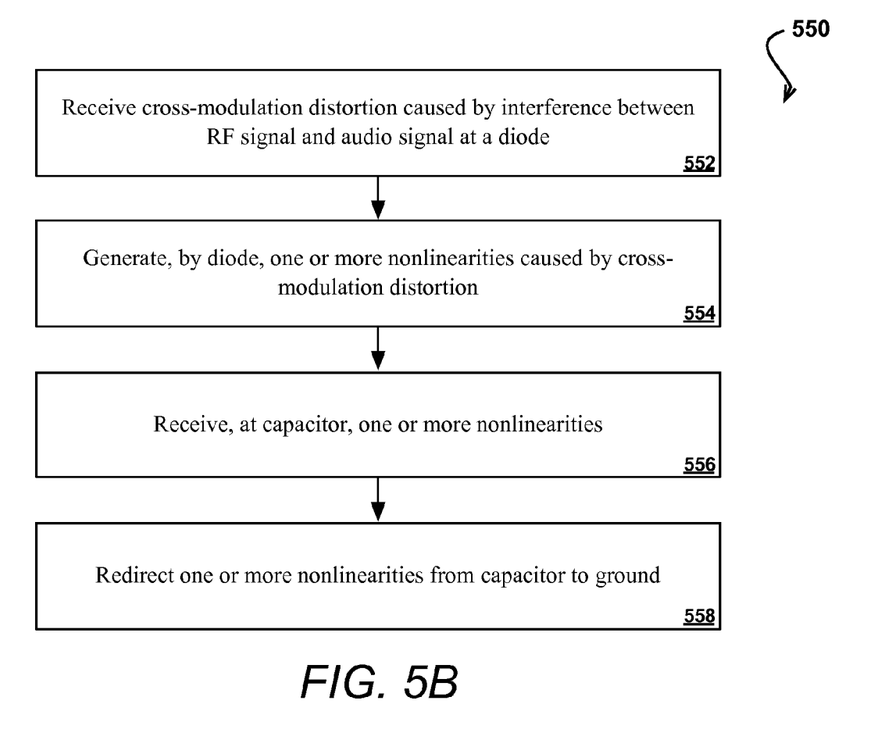
FIG. 5B illustrates steps of an example process for using a capacitor for redirecting nonlinearities from a diode to a ground in a mobile computing device that can be used in accordance with some embodiments of the subject technology.

FIG. 5B illustrates steps of an example process 550 for using a capacitor for redirecting nonlinearities from a diode to a ground in a mobile computing device that can be used in accordance with some embodiments of the subject technology. In some embodiments, the process 550 may be implemented by one or more computing devices or systems. More specifically, the process 550 may be implemented by a given mobile computing device.

In some embodiments, the process 550 may be implemented by the apparatus described in FIGS. 1-3, which may be included as part of a given computing device, such as a mobile computing device with a radio transmitter/receiver to provide cellular or wireless communications and at least one speaker.

At step 552, cross-modulation distortion including one or more harmonics of an RF signal, caused by interference between the RF signal and an audio signal, is received at a diode. In at least one embodiment, the diode is connected in parallel to a capacitor. At step 554, one or more nonlinearities, caused by the cross-modulation distortion including the harmonics of the RF signal being received at the diode, are generated by the diode. At step 556, the one or more nonlinearities, which may include the harmonics of the RF signal, are received at the capacitor. In at least one embodiment, the capacitor is coupled to a ground. At step 558, the one or more nonlinearities from the capacitor are redirected to the ground.

Figure 6A:
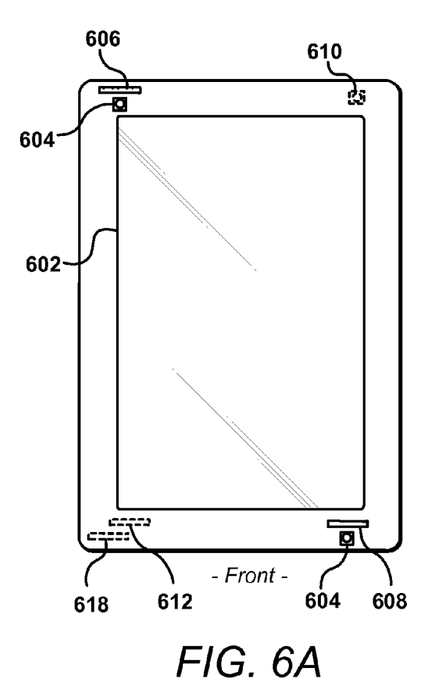
FIGS. 6A and 6B illustrate front and back views, respectively, of an example electronic computing device that can be used in accordance with various embodiments.
Figure 6B:
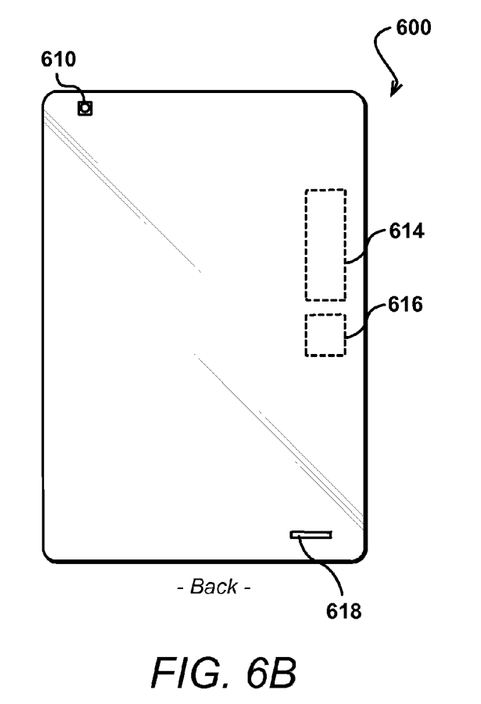

FIGS. 6A and 6B illustrate front and back views, respectively, of an example electronic computing device 600 that can be used in accordance with various embodiments. Although a portable computing device (e.g., a smartphone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, television set top boxes, and portable media players, among others.

In this example, the computing device 600 has a display screen 602 (e.g., an LCD element) operable to display information or image content to one or more users or viewers of the device. The display screen of some embodiments displays information to the viewers facing the display screen (e.g., on the same side of the computing device as the display screen). The computing device in this example can include one or more imaging elements, in this example including two image capture elements 604 on the front of the device and at least one image capture element 610 on the back of the device. It should be understood, however, that image capture elements could also, or alternatively, be placed on the sides or corners of the device, and that there can be any appropriate number of capture elements of similar or different types. Each image capture element 604 and 610 may be, for example, a camera, a charge-coupled device (CCD), a motion detection sensor or an infrared sensor, or other image capturing technology.

As discussed, the device can use the images (e.g., still or video) captured from the imaging elements 604 and 610 to generate a three-dimensional simulation of the surrounding environment (e.g., a virtual reality of the surrounding environment for display on the display element of the device). Further, the device can utilize outputs from at least one of the image capture elements 604 and 610 to assist in determining the location and/or orientation of a user and in recognizing nearby persons, objects, or locations. For example, if the user is holding the device, the captured image information can be analyzed (e.g., using mapping information about a particular area) to determine the approximate location and/or orientation of the user. The captured image information may also be analyzed to recognize nearby persons, objects, or locations (e.g., by matching parameters or elements from the mapping information).

The computing device can also include at least one microphone or other audio capture elements capable of capturing audio data, such as words spoken by a user of the device, music being hummed by a person near the device, or audio being generated by a nearby speaker or other such component, although audio elements are not required in at least some devices. In this example there are three microphones, one microphone 608 on the front side, one microphone 612 on the back, and one microphone 606 on or near a top or side of the device. In some devices there may be only one microphone, while in other devices there might be at least one microphone on each side and/or corner of the device, or in other appropriate locations.

The device 600 in this example also includes one or more orientation- or position-determining elements 618 operable to provide information such as a position, direction, motion, or orientation of the device. These elements can include, for example, accelerometers, inertial sensors, electronic gyroscopes, and electronic compasses.

The example device also includes at least one computing mechanism 614, such as may include at least one wired or wireless component operable to communicate with one or more electronic devices. The device also includes a power system 616, such as may include a battery operable to be recharged through conventional plug-in approaches, or through other approaches such as capacitive charging through proximity with a power mat or other such device. Various other elements and/or combinations are possible as well within the scope of various embodiments.

Figure 7:
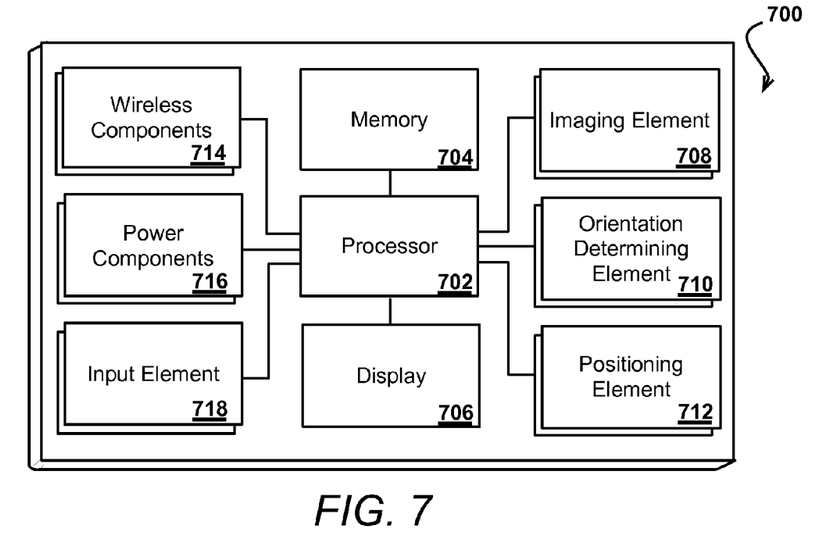
FIG. 7 illustrates a set of basic components of an electronic computing device such as the device described with respect to FIGS. 6A and 6B.

FIG. 7 illustrates a set of basic components of an electronic computing device 700 such as the device 600 described with respect to FIGS. 6A and 6B. In this example, the device includes at least one processing unit 702 for executing instructions that can be stored in a memory device or element 704. As would be apparent to one of ordinary skill in the art, the device can include many types of memory, data storage, or computer-readable media, such as a first data storage for program instructions for execution by the processing unit(s) 702, the same or separate storage can be used for images or data, a removable memory can be available for sharing information with other devices, and any number of computing approaches can be available for sharing with other devices.

The device typically will include some type of display element 706, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 708, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 700 also includes at least one orientation determining element 710 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 700. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 712 for determining a location of the device (or the user of the device). A positioning element can include or comprise a GPS or similar location-determining elements operable to determine relative coordinates for a position of the device. As mentioned above, positioning elements may include wireless access points, base stations, etc. that may either broadcast location information or enable triangulation of signals to determine the location of the device. Other positioning elements may include QR codes, barcodes, RFID tags, NFC tags, etc. that enable the device to detect and receive location information or identifiers that enable the device to obtain the location information (e.g., by mapping the identifiers to a corresponding location). Various embodiments can include one or more such elements in any appropriate combination.

As mentioned above, some embodiments use the element(s) to track the location of a device. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device.

The example device also includes one or more wireless components 714 operable to communicate with one or more electronic devices within a computing range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device also includes a power system 716, such as may include a battery operable to be recharged through conventional plug-in approaches, or through other approaches such as capacitive charging through proximity with a power mat or other such device. Various other elements and/or combinations are possible as well within the scope of various embodiments.

In some embodiments the device can include at least one additional input device 718 able to receive conventional input from a user. This conventional input can include, for example, a push button, touch pad, touch screen, wheel, joystick, keyboard, mouse, keypad, or any other such device or element whereby a user can input a command to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

Figure 8:
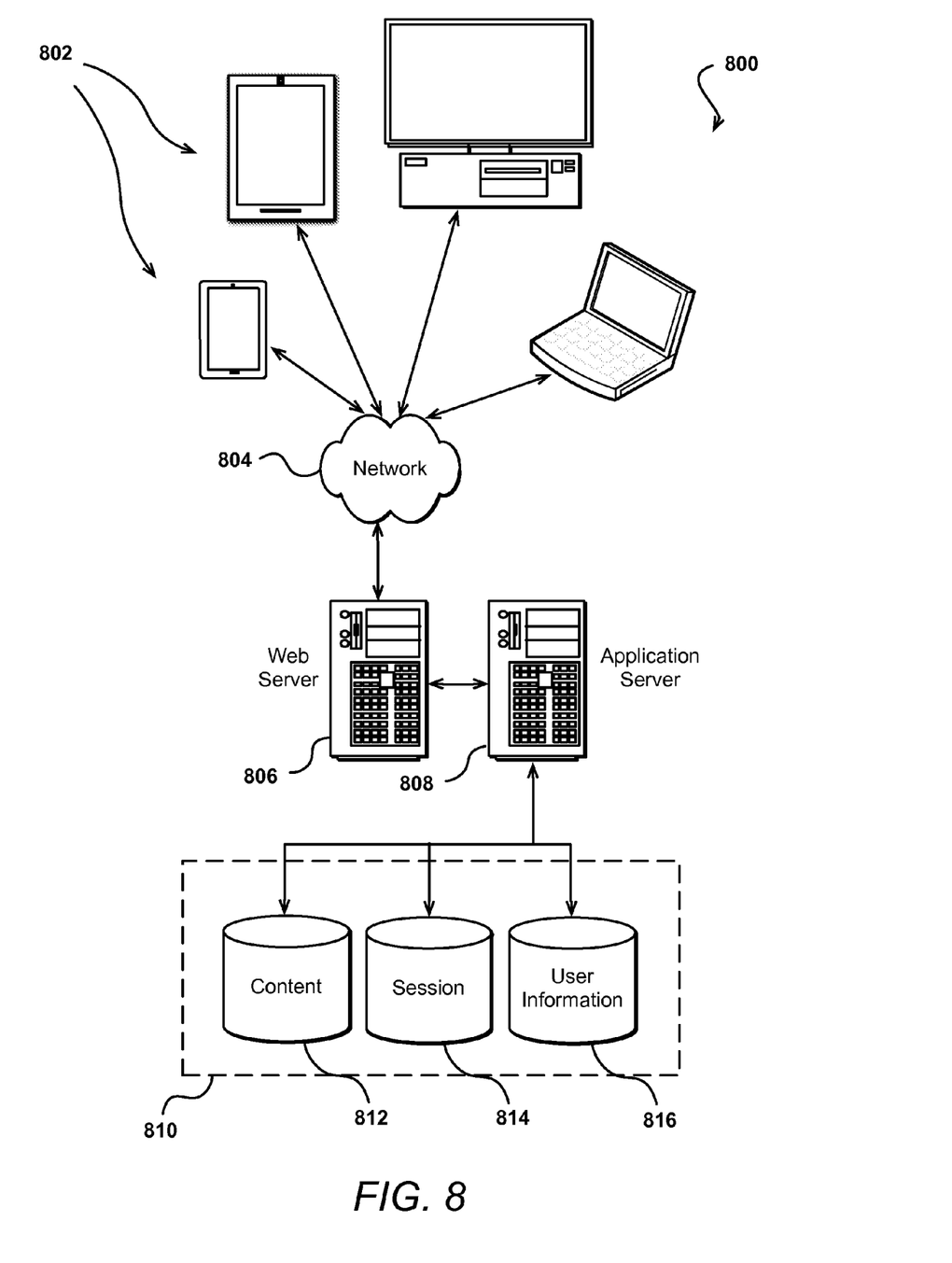
FIG. 8 illustrates an example of an environment for implementing aspects in accordance with various embodiments of the subject technology.

As discussed, different approaches can be implemented in various environments in accordance with the described embodiments. For example, FIG. 8 illustrates an example of an environment 800 for implementing aspects in accordance with various embodiments. As will be appreciated, although a Web-based environment is used for purposes of explanation, different environments may be used, as appropriate, to implement various embodiments. The system includes an electronic client device 802, which can include any appropriate device operable to send and receive requests, messages or information over an appropriate network 804 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. The network could be a "push" network, a "pull" network, or a combination thereof. In a "push" network, one or more of the servers push out data to the client device. In a "pull" network, one or more of the servers send data to the client device upon request for the data by the client device. Components used for such a system can depend at least in part upon the type of network and/or environment selected. Protocols and components for communicating via such a network are well known and will not be discussed herein in detail. Computing over the network can be enabled via wired or wireless connections and combinations thereof. In this example, the network includes the Internet, as the environment includes a Web server 806 for receiving requests and serving content in response thereto, although for other networks, an alternative device serving a similar purpose could be used, as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 808 can include any appropriate hardware and software for integrating with the data store 810 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 806 in the form of HTML, XML or another appropriate structured language in this example. The handling of all requests and responses, as well as the delivery of content between the client device 802 and the application server 808, can be handled by the Web server 806. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing content (e.g., production data) 812 and user information 816, which can be used to serve content for the production side. The data store is also shown to include a mechanism for storing log or session data 814. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 802. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via computing links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN"). Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and other non-transitory computer readable media for containing code, or portions of code, can include any appropriate storage media used in the art, such as but not limited to volatile and non-volatile, removable and non-removable media implemented in any method or technology for storage of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A mobile computing device comprising:
   a speaker trace etched on a portion of a printed circuit board (PCB) of the mobile computing device, at least a portion of the speaker trace comprising a speaker contact;
   a speaker coupled to the speaker contact, the speaker configured to receive an audio signal;
   an antenna wherein at least a portion of the antenna is disposed on top of at least a portion of the speaker and wherein the antenna is configured to tune, by using the speaker trace, to an operating frequency for receiving a radio frequency (RF) signal during substantially a same time as the audio signal is received by the speaker, the operating frequency being greater than a frequency of the audible signal, the speaker trace being a part of the antenna;
   an inductor coupled to a portion of the speaker trace that receives the RF signal and adjacent to a portion of a ground trace, the inductor configured to operate as an open circuit that isolates the antenna from the ground trace, the inductor having a high reactance value that impedes current at the operating frequency;
   an electrostatic discharge (ESD) protection diode connected in series with the inductor, the ESD protection diode being coupled to a first ground included on a first portion of the ground trace and coupled to a first portion of a second speaker trace; and
   a capacitor connected in parallel with the ESD protection diode, the capacitor being coupled to a second ground included on a second portion of the ground trace and coupled to a second portion of the second speaker trace, the inductor configured to prevent the antenna from being electrically coupled to the first ground and the second ground at the operating frequency.

2. The apparatus of claim 1, wherein the audio signal is passed through the inductor and the RF signal is impeded by the inductor when the audio signal and the RF signal are received substantially at the same time.

3. The apparatus of claim 1, wherein the ESD protection diode is further configured to receive cross-modulation distortion including one or more harmonic frequency components of the RF signal, the cross-modulation distortion being caused by interference between the RF signal and the audio signal, and wherein the capacitor is further configured to receive the one or more harmonic frequency components and redirect the one or more harmonic frequency components to the second ground.

4. A computer-implemented method comprising:
   receiving, by a mobile computing device, a radio frequency (RF) signal at an antenna of the mobile computing device;
   receiving, by the mobile computing device, an audio signal at a speaker of the mobile computing device, a portion of the speaker and a portion of the antenna being collocated in the mobile computing device;
   allowing the audio signal to pass through an inductor;
   inhibiting the RF signal from passing through the inductor, the inductor being connected in series to the speaker and coupled to a first ground;
   receiving cross-modulation distortion at a diode, the cross-modulation distortion including one or more harmonics of the RF signal, the one or more harmonics being caused by interference between the RF signal and the audio signal, the diode being connected in parallel to a capacitor;
   receiving, at the capacitor, the one or more harmonics, the capacitor being coupled to a second ground; and
   redirecting the one or more harmonics from the capacitor to the second ground.

5. The computer-implemented method of claim 4, further comprising:
   receiving a buildup of electrostatic charge at the mobile computing device; and
   redirecting the buildup of electrostatic charge as an electrostatic discharge to the first ground via the diode, the diode being coupled to the inductor and the first ground.

6. The computer-implemented method of claim 4, wherein the inductor is connected in series with the diode and in series with the capacitor.

7. The computer-implemented method of claim 4, wherein the RF signal has a frequency in a range of 700 megahertz to 6 gigahertz.

8. The computer-implemented method of claim 4, wherein the audio signal has a frequency included in a range of 20 hertz to 20,000 hertz.

9. The computer-implemented method of claim 4, wherein the mobile computing device further comprises an RF receiver, the RF receiver being configured to receive the RF signal.

10. The computer-implemented method of claim 4, wherein the antenna includes at least a portion of a speaker trace, the speaker trace being coupled to the speaker and configured to relay the audio signal to the speaker.

11. The computer-implemented method of claim 10, wherein the speaker trace is used for tuning the antenna to receive signals in a frequency band.

12. The computer-implemented method of claim 4, wherein the inductor electrically isolates the speaker from the first ground.

13. A system, the system comprising:
   an antenna configured to receive a radio frequency (RF) signal;
   a speaker configured to receive an audio signal, the speaker and the antenna being collocated at substantially a same location on a computing device;
   an inductor configured to pass the audio signal and inhibit the RF signal from passing through the inductor, the inductor being connected in series to the speaker and coupled to a first ground;

a diode configured to receive RF energy from the antenna and generate one or more nonlinearities; and a capacitor configured to receive the one or more nonlinearities, the capacitor being connected in parallel to the diode, the capacitor being coupled to a second ground and further configured to redirect the one or more nonlinearities to the second ground, wherein the inductor is connected in series to the diode and the capacitor.

14. The system of claim 13, wherein the diode is configured to redirect a buildup of electrostatic charge as an electrostatic discharge to the first ground, the diode being coupled to the inductor and the first ground.

15. The system of claim 13, wherein the system further comprises an RF receiver, the RF receiver being configured to receive the RF signal.

16. The system of claim 13, wherein the speaker is positioned on top of the antenna.

17. The system of claim 13, wherein the antenna includes at least a portion of a speaker trace, the speaker trace being coupled to the speaker and configured to relay the audio signal to the speaker.

18. The system of claim 17, wherein the speaker trace is used for tuning the antenna to receive signals in a particular frequency band.

* * * * *